(12) United States Patent
Lakov et al.

(10) Patent No.: US 7,365,444 B2
(45) Date of Patent: Apr. 29, 2008

(54) ACTIVE ANTI-ISLANDING SYSTEM AND METHOD

(75) Inventors: German Lakov, North Andover, MA (US); Randall G. Finstad, Dover, NH (US)

(73) Assignee: Southern California Gas Company, Los Angeles, CA (US)

( * ) Notice: Subject to any disclaimer, the term of this patent is extended or adjusted under 35 U.S.C. 154(b) by 0 days.

(21) Appl. No.: 11/563,333

(22) Filed: Nov. 27, 2006

(65) Prior Publication Data

US 2007/0096471 A1 May 3, 2007

Related U.S. Application Data

(63) Continuation of application No. 10/795,953, filed on Mar. 8, 2004, now Pat. No. 7,161,257.

(51) Int. Cl.
*F02N 11/06* (2006.01)
*H02P 9/04* (2006.01)

(52) U.S. Cl. .................................................. 290/40 R

(58) Field of Classification Search ................ 290/52, 290/40 R; 702/60; 307/31, 43, 35
See application file for complete search history.

(56) References Cited

U.S. PATENT DOCUMENTS

| | | | |
|---|---|---|---|
| 3,491,248 A | 1/1970 | Beckwith et al. | |
| 3,499,164 A * | 3/1970 | Ferre et al. | 290/17 |
| 3,599,007 A | 8/1971 | Martin, Jr. | |
| 3,617,838 A | 11/1971 | Brandt | |
| 3,750,001 A | 7/1973 | McCloskey | |
| 3,781,616 A | 12/1973 | Mokrytzki et al. | |
| 3,794,846 A | 2/1974 | Schlicher et al. | |
| 3,975,646 A | 8/1976 | Kilgore et al. | |
| 4,001,666 A | 1/1977 | Grenfell | |
| 4,031,407 A | 6/1977 | Reed | |
| 4,039,909 A | 8/1977 | Baker | |
| 4,096,557 A | 6/1978 | Schwarz | |
| 4,132,931 A | 1/1979 | Okuyama et al. | |
| 4,142,367 A | 3/1979 | Guisti | |
| 4,227,136 A | 10/1980 | Roesel, Jr. | |
| 4,249,120 A | 2/1981 | Earle | |
| 4,256,972 A | 3/1981 | Wyatt et al. | |
| 4,276,482 A | 6/1981 | Crockett | |
| 4,277,735 A | 7/1981 | Okuyama et al. | |
| 4,344,025 A | 8/1982 | Okuyama et al. | |
| 4,352,024 A | 9/1982 | Geary et al. | |
| 4,392,099 A | 7/1983 | Kuniyoshi | |

(Continued)

FOREIGN PATENT DOCUMENTS

EP 0570976 A2 11/1993

(Continued)

*Primary Examiner*—Julio Gonzalez
(74) *Attorney, Agent, or Firm*—Michael Best & Friedrich LLP

(57) ABSTRACT

An engine control system suited for use with an engine that outputs electrical power to a local load and is electrically connected to an electrical grid. The engine generates power at a power output value and the load consumes power at a load value. The engine control system includes a sensor that measures an electrical parameter indicative of a difference between the power output value and the load value, and a master control system that varies the engine power output value to prevent the electrical parameter from reaching zero.

3 Claims, 3 Drawing Sheets

U.S. PATENT DOCUMENTS

| | | |
|---|---|---|
| 4,401,938 A | 8/1983 | Cronin |
| 4,417,194 A | 11/1983 | Curtiss et al. |
| 4,426,611 A | 1/1984 | Espelage et al. |
| 4,455,522 A | 6/1984 | Lipo |
| 4,476,424 A | 10/1984 | Kalman |
| 4,517,467 A | 5/1985 | Führing |
| 4,533,835 A | 8/1985 | Beckwith |
| 4,672,298 A | 6/1987 | Rohatyn |
| 4,694,189 A | 9/1987 | Haraguchi et al. |
| 4,701,691 A | 10/1987 | Nickoladze |
| 4,710,692 A | 12/1987 | Libert et al. |
| 4,723,104 A | 2/1988 | Rohatyn |
| 4,743,777 A | 5/1988 | Shilling et al. |
| 4,757,240 A | 7/1988 | Mizobuchi et al. |
| 4,791,309 A | 12/1988 | Payne et al. |
| 4,794,316 A | 12/1988 | Uchino et al. |
| 4,806,781 A | 2/1989 | Hochstetter |
| 4,816,696 A | 3/1989 | Sakayori et al. |
| 5,028,804 A | 7/1991 | Lauw |
| 5,111,377 A | 5/1992 | Higasa et al. |
| 5,162,964 A | 11/1992 | Higasa et al. |
| 5,493,485 A | 2/1996 | Okado |
| 5,686,766 A | 11/1997 | Tamechika |
| 5,808,449 A | 9/1998 | Hirayama et al. |
| 5,992,950 A | 11/1999 | Kumar et al. |
| 5,998,880 A | 12/1999 | Kumar |
| 6,107,784 A | 8/2000 | Nomiya et al. |
| 6,172,889 B1 | 1/2001 | Eguchi et al. |
| 6,219,623 B1 | 4/2001 | Wills |
| 6,281,595 B1 | 8/2001 | Sinha et al. |
| 6,429,546 B1 | 8/2002 | Ropp et al. |
| 6,545,885 B2 | 4/2003 | Nishimura et al. |
| 6,845,020 B2 * | 1/2005 | Deng et al. .................... 363/37 |
| 6,894,403 B2 | 5/2005 | Shinogi |
| 6,920,387 B2 * | 7/2005 | Landes et al. ............... 701/102 |
| 7,161,257 B2 | 1/2007 | Lakov et al. |
| 2001/0056330 A1 | 12/2001 | Wills |
| 2002/0047699 A1 | 4/2002 | Katoh et al. |
| 2002/0048179 A1 | 4/2002 | Nomiya et al. |
| 2002/0060556 A1 | 5/2002 | Wall |
| 2002/0190695 A1 | 12/2002 | Wall et al. |
| 2003/0007369 A1 | 1/2003 | Gilbreth et al. |
| 2003/0015873 A1 | 1/2003 | Khalizadch et al. |
| 2003/0080741 A1 | 5/2003 | LeRow et al. |
| 2003/0098671 A1 | 5/2003 | Hochgraf |
| 2003/0109977 A1 * | 6/2003 | Landes et al. ................. 701/54 |
| 2007/0096471 A1 * | 5/2007 | Lakov et al. .............. 290/40 A |

FOREIGN PATENT DOCUMENTS

| | | |
|---|---|---|
| EP | 0677911 A1 | 10/1995 |
| EP | 0746078 A2 | 12/1996 |
| EP | 0810713 A2 | 3/1997 |
| EP | 1278282 A1 | 1/2003 |
| JP | 02046135 A * | 2/1990 |
| JP | 6014465 A | 1/1994 |
| JP | 6141470 A | 5/1994 |
| JP | 6327258 A | 11/1994 |
| JP | 8331765 A | 12/1996 |
| JP | 9247863 A | 9/1997 |
| JP | 10257678 A | 9/1998 |
| WO | 9927629 A1 | 6/1999 |
| WO | 03106828 A2 | 12/2003 |

* cited by examiner

ACTIVE ANTI-ISLANDING SYSTEM AND METHOD

RELATED APPLICATION

This application claims priority to U.S. patent application Ser. No. 10/795,953, filed Mar. 8, 2004 now U.S. Pat. No. 7,161,953, the entire contents of which are incorporated herein by reference.

BACKGROUND

The present invention relates to system for inhibiting an islanding condition from occurring. More particularly, the present invention relates to a system and method for inhibiting an islanding condition from occurring in an engine driven generator connected to an electrical grid.

Microturbine engines are relatively small and efficient sources of power. Microturbines can be used to generate electricity and/or to power auxiliary equipment such as pumps or compressors. When used to generate electricity, microturbines can be used independent of the utility grid or synchronized to the utility grid. In general, microturbine engines are limited to applications requiring 2 megawatts (MW) of power or less. However, some applications larger than 2 MWs may utilize a microturbine engine.

In many applications, microturbine engines are used to supply power for a local load that is simultaneously connected to an electrical grid (i.e., a utility grid). When connected to the grid, it is important to monitor the system for islanding conditions. Islanding exists when the microturbine engine provides power to the local load with the electrical grid connection severed at some point. This condition can be problematic, as the microturbine engine may not be able to react to sudden load changes or may not be able to provide a sudden increase in demand without the support of the electrical grid. As such, an undesirable trip may occur severing all of the power being supplied to the local load. Therefore, it is desirable to detect islanding conditions and to take steps to isolate the local load or remedy the islanding condition when it is detected.

While many islanding detection schemes are known, most have difficulty detecting islanding conditions that arise when the microturbine output is closely matched with the local load.

SUMMARY

In one embodiment, an engine control system suited for use with an engine that outputs electrical power to a local load and is electrically connected to an electrical grid includes a sensor and a master control system. The engine generates power at a power output value and the load consumes power at a load value. The sensor measures an electrical parameter indicative of a difference between the power output value and the load value. The master control system varies the engine power output value to prevent the electrical parameter from reaching zero.

In another embodiment, an engine control system is provided for avoiding an islanding condition. The engine control system controls an engine that generates power and is electrically connected to an electrical grid and a local load that consumes power. The engine control system includes a sensor and a master control system. The sensor transmits a signal indicative of the difference between the power generated by the engine and the power consumed by the load. The master control system receives the signal and varies the power generated by the engine to maintain a difference between the power generated by the engine and the power consumed by the load.

Other aspects of the invention will become apparent by consideration of the detailed description and accompanying drawings.

BRIEF DESCRIPTION OF THE DRAWINGS

The description particularly refers to the accompanying figures in which.

Before any embodiments of the invention are explained, it is to be understood that the invention is not limited in its application to the details of construction and the arrangements of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof is meant to encompass the items listed thereafter and equivalence thereof as well as additional items. The terms "connected," "coupled," and "mounted" and variations thereof are used broadly and encompass direct and indirect connections, couplings, and mountings. In addition, the terms "connected," "coupled," and "mounted" and variations thereof are not restricted to physical or mechanical connections or couplings.

DETAILED DESCRIPTION

Figure 1:
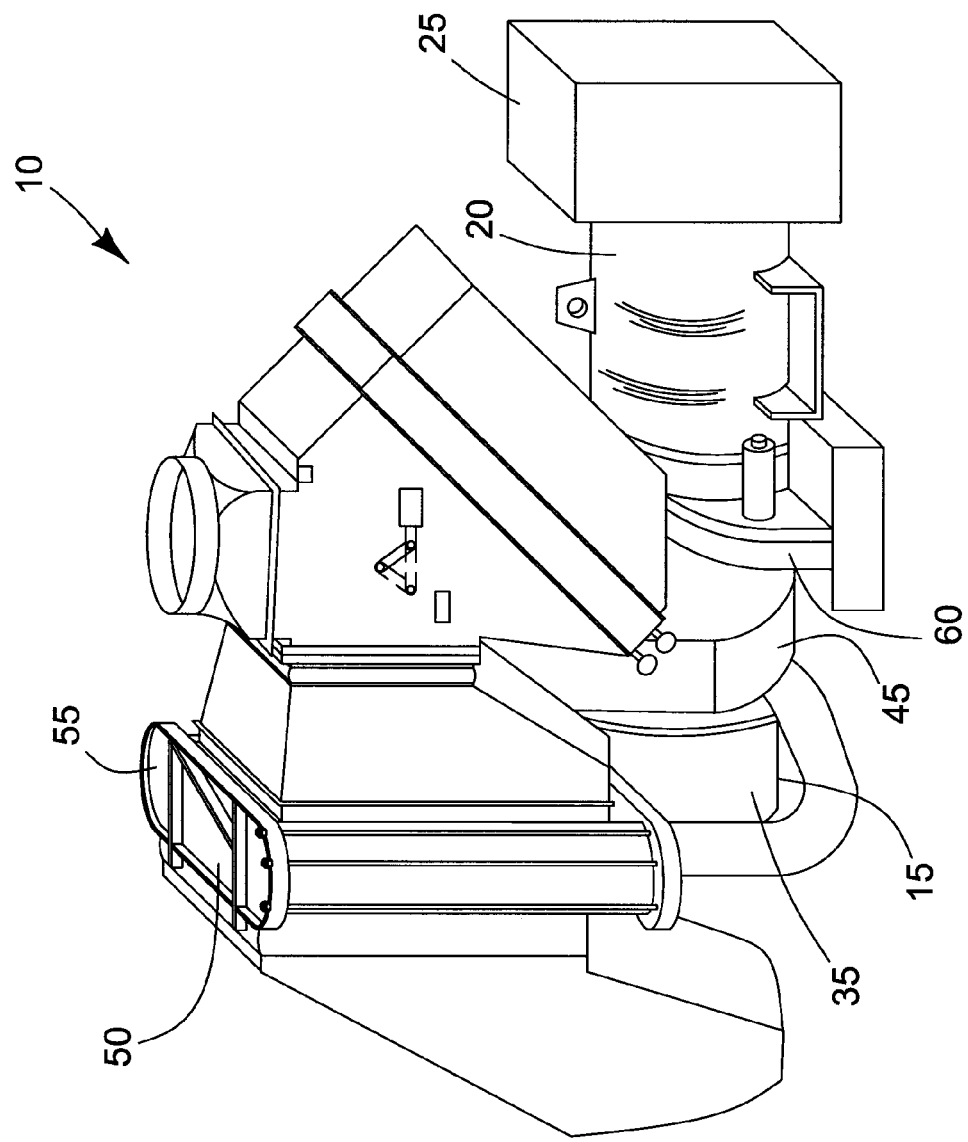
FIG. 1 is a perspective view of a portion of a microturbine engine.

With reference to FIG. 1, a microturbine engine system 10 that includes a turbine section 15, a generator section 20, and a control system 25 is illustrated. The turbine section 15 includes a radial flow turbine 35, a compressor 45, a recuperator 50, a combustor 55, and a gearbox 60.

The engine 10 includes a Brayton cycle combustion turbine with the recuperator 50 added to improve engine efficiency. The engine shown is a single-spool engine (one set of rotating elements). However, multi-spool engines are also contemplated by the invention. The compressor 45 is a centrifugal-type compressor having a rotary element that rotates in response to operation of the turbine 35. The compressor 45 shown is generally a single-stage compressor. However, multi-stage compressors can be employed where a higher pressure ratio is desired. Alternatively, compressors of different designs (e.g., axial-flow compressors, reciprocating compressors, and the like) can be employed to supply compressed air for use in the engine 10.

The turbine 35 is a radial flow single-stage turbine having a rotary element directly coupled to the rotary element of the compressor 45. In other constructions, multi-stage turbines or other types of turbines may be employed. The coupled rotary elements of the turbine 35 and the compressor 45 engage the gearbox 60 or other speed reducer disposed between the turbine section 15 and the generator section 20.

In other constructions, the coupled rotary elements directly engage the generator section 20.

The recuperator 50 includes a heat exchanger employed to transfer heat from a hot fluid to the relatively cool compressed air leaving the compressor 45. One suitable recuperator 50 is described in U.S. Pat. No. 5,983,992 fully incorporated herein by reference. The recuperator 50 includes a plurality of heat exchange cells stacked on top of one another to define flow paths therebetween. The cool compressed air flows within the individual cells, while a flow of hot exhaust gas passes between the heat exchange cells.

During operation of the microturbine engine system 10, the rotary element of the compressor 45 rotates in response to rotation of the rotary element of the turbine 35. The compressor 45 draws in atmospheric air and increases its pressure. The high-pressure air exits the air compressor 45 and flows to the recuperator 50.

The flow of compressed air, now preheated within the recuperator 50, flows to the combustor as a flow of preheated air. The preheated air mixes with a supply of fuel within the combustor 55 and is combusted to produce a flow of products of combustion. The use of the recuperator 50 to preheat the air allows for the use of less fuel to reach the desired temperature within the flow of products of combustion, thereby improving engine efficiency.

The flow of products of combustion enters the turbine 35 and transfers thermal and kinetic energy to the turbine 35. The energy transfer results in rotation of the rotary element of the turbine 35 and a drop in the temperature of the products of combustion. The energy transfer allows the turbine 35 to drive both the compressor 45 and the generator 20. The products of combustion exit the turbine 35 as a first exhaust gas flow.

In constructions that employ a second turbine, the first turbine 35 drives only the compressor, while the second turbine drives the generator 20 or any other device to be driven. The second turbine receives the first exhaust flow, rotates in response to the flow of exhaust gas therethrough, and discharges a second exhaust flow.

The first exhaust flow, or second exhaust flow in two turbine engines, enters the flow areas between the heat exchange cells of the recuperator 50 and transfers excess heat energy to the flow of compressed air. The exhaust gas then exits the recuperator 50 and is discharged to the atmosphere, processed, or further used as desired (e.g., cogeneration using a second heat exchanger).

Figure 2:
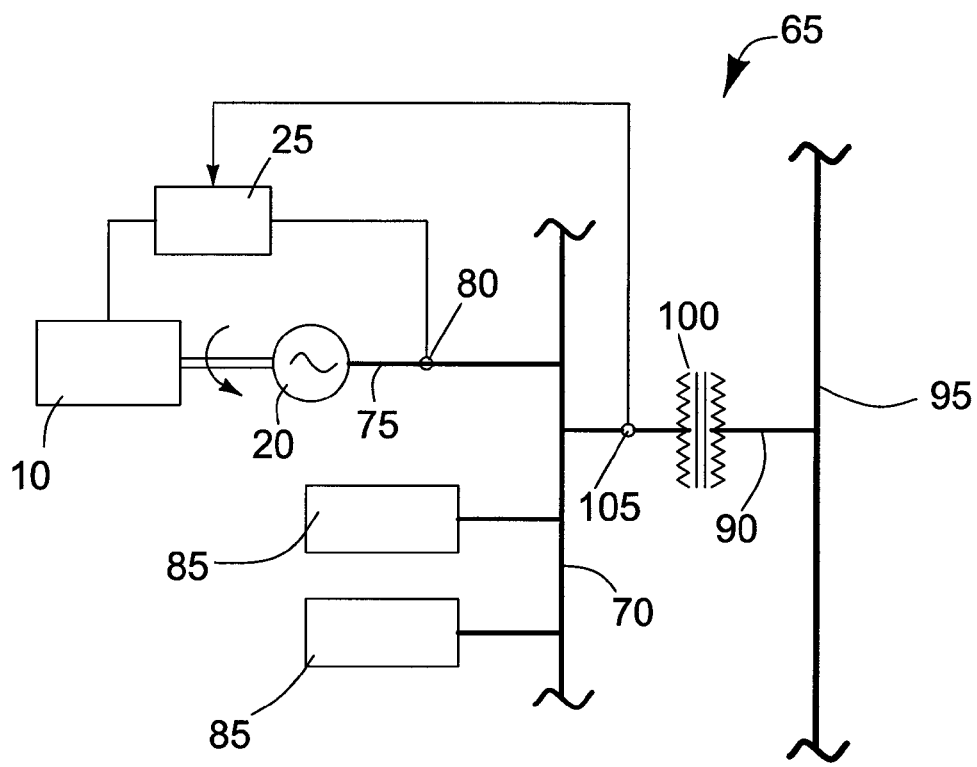
FIG. 2 is a schematic illustration of a portion of a power distribution system including the microturbine engine of FIG. 1.
Figure 3:
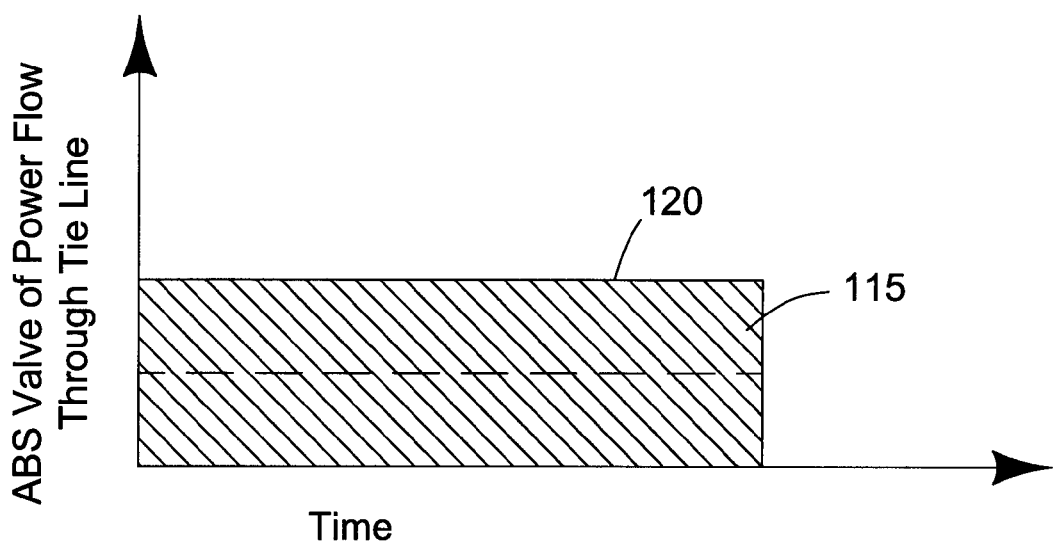
FIG. 3 is a chart illustrating a restricted zone.

Turning to FIG. 2, a portion of the electrical and control systems of a power distribution system 65 is illustrated schematically. As previously described, the microturbine engine 10 drives the generator 20 to produce an electrical output. The system illustrated herein includes a synchronous generator 20, with other types of generators (e.g., high-speed alternators, asynchronous generators and the like) also functioning with the present invention. The generator output is delivered to a local load bus 70 via a generator output line 75. A generator sensor 80, positioned within the generator output line 75, measures an electrical parameter of the generator 20 during engine operation. In most constructions, the generator sensor 80 includes a current sensor. The measured current, along with a known voltage, can be used to calculate an actual generator output power. Other constructions can include multiple sensors that measure current, voltage, and/or power directly. The generator sensor 80 can continuously monitor the electrical parameter or can take periodic measurements as desired.

The generator output line 75 connects to, and delivers power to, the local load bus 70. Various local loads 85 (e.g., motors, computers, monitors, robots, welding machines, lights, etc.) may be powered off the local load bus 70.

Figure 4:
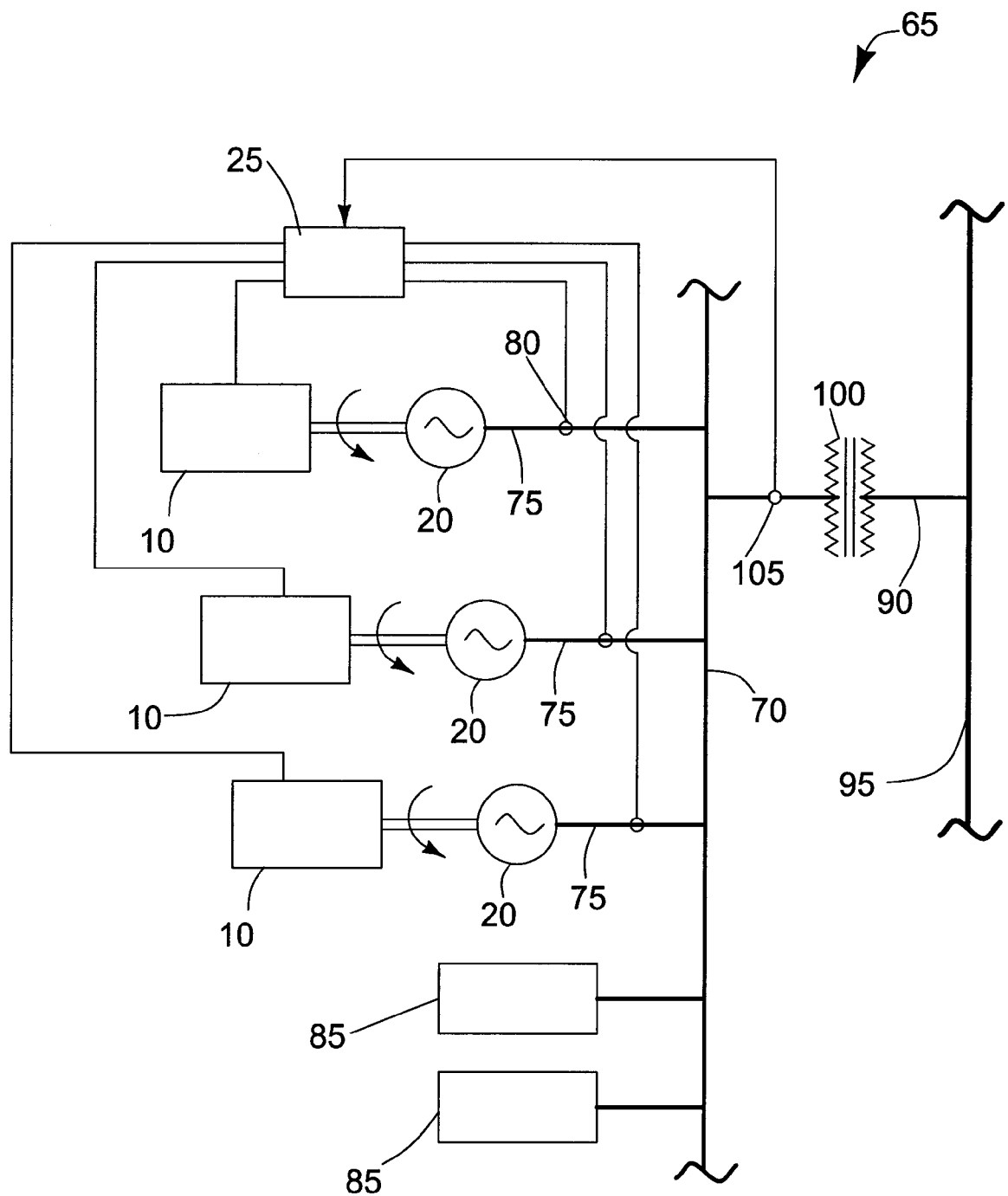
FIG. 4 is a schematic illustration of a portion of a power distribution system including a plurality of microturbine engines.

In some constructions, multiple microturbine engine systems 10, or other generation systems (e.g., diesel, solar, wind, fuel cell, and the like) are connected to the local load bus 70, with some or all of them simultaneously providing power to the power distribution system 65. FIG. 4 illustrates one possible system that includes multiple engine systems 10. Each engine system 10 is electrically connected to the local load bus 70 to allow each engine 10 to provide electrical power. Generator sensors 80a, 80b are positioned to measure the actual output of each engine system 10. The control system 25 is then able to individually control each engine 10 to produce the desired total output. In many constructions, the control system 25 is able to start or stop individual engines to optimize the system's operation, while providing the desired amount of total power.

A tie line 90 interconnects the local load bus 70 and a utility grid 95. A transformer 100 may be disposed within the tie line 90 to step-up or step-down the voltage between the utility grid 95 and the local load bus 70. The tie line 90 facilitates the delivery of electricity from the utility grid 95 to the local load bus 70 and/or from the microturbine engine 10 to the utility grid 95. The tie line 90 also includes a tie line sensor 105 that measures an electrical parameter (e.g., voltage, current, absolute value of current, power, phase angle, frequency, and the like). In most constructions, the tie line sensor 105 includes a current sensor that measures both the magnitude and direction of current flow within the tie line 90. However, other constructions may include multiple sensors that measure current, voltage, and/or power flow. The tie line sensor 105 can continuously monitor the electrical parameter or can take periodic measurements as desired.

In some constructions, the microturbine engine 10 operates intermittently. As such, the tie line 90 is sized to carry sufficient electricity to power the local loads 85 during periods in which the microturbine engine 10 is inoperative. With the generator 20 synchronized to the utility grid 95 (i.e., the voltage, phase angle, and frequency of the generator output power matched with the utility grid power), both the generator 20 and the utility grid 95 can provide power to the local load bus 70 and the local loads 85.

The microturbine engine 10 includes a control system 25 that controls the operation of the engine 10 (or engines in a multiple engine system). The control system 25 manipulates various components (e.g., valves, pumps, compressors, louvers, switches, relays, and the like) that control various operating parameters of the engine 10. For example, the control system 25 may control fuel flow to the engine 10 to control engine speed and/or power output. The control system 25 may move or initiate movement of a controller that in turn may manipulate a valve, a compressor, or other control member to control the flow of fuel to the combustor 55, which in turn controls the speed or the power output of the engine 10.

When the generator 20 is synchronized to the utility grid 95, the speed of the generator 20 is substantially fixed and the control system 25 controls output power. A power output set point is supplied to the control system 25, which then maintains the generator output at a value substantially equal to the power output set point. There are many different ways of inputting the power output set point. For example, a manual control could be used. The manual control would allow a user to input a desired value between the engine's minimum and maximum output. In systems that include more than one engine 10, individual power output set points for each engine 10 may be used to control the output of each engine 10. Alternatively, a single power output set point that controls the total output of all the engines may be used. In the later case, the control system 25 would determine the specific output levels of each engine 10 using any one of a number of known schemes. In some constructions, a pre-programmed curve is used to set the power output set point. The curve typically defines a power output set point that varies with the time of day, day of the week, and/or day of the year. However, other parameters (e.g., temperature, pressure, etc.) could also be used to vary the power output set point.

During operation of the system 65, it is possible for a failure of the utility grid 95 to occur, thus producing an islanding condition. Islanding conditions can arise at any time, but are particularly problematic when the power consumed by the local load 85 is very near the power level output by the generator 20. Under these "perfectly matched" circumstances, the islanding condition is very difficult to detect using known methods (e.g., rate of change of frequency ROCOF, and the like).

To improve the likelihood of detecting an islanding condition, the present system 65 inhibits operation of the engine 10 (or engines) in a particular range or restricted zone 115. The restricted zone is defined as a power flow within the tie line 90 (into or out of the utility grid 95) between zero and a predetermined minimum desired power flow 120, with the minimum desired power flow 120 being a non-zero value. Specifically, the control system 25 receives a signal from the tie line sensor 105 indicating the level of power flow through the tie line 90. The control system 25 then compares that signal to a predetermined value representing the minimum desired power flow 120 through the tie line 90. The signal may represent a power flow into the local load bus 70 or a power flow to the utility grid 95. If the value falls below the minimum desired power flow 120, the power output set point is automatically adjusted. This process continues until the measured power flow through the tie line 90 exceeds the minimum desired power flow 120. With the measured power flow out of the restricted zone 115, islanding detection is much easier and is more reliable. As one of ordinary skill will realize, the actual direction of power flow (i.e. into the local load bus or out of the local load bus) does not significantly affect the ability of the present system to detect islanding so long as sufficient power is flowing. As such, the absolute value of the measured power in the tie line 90 is typically all that needs to be measured. In preferred constructions, a minimum power corresponding to a current flow of 500 amps allows for detection of islanding conditions. In still other constructions, a power flow of 100 amps or less allows for the detection of islanding. As one of ordinary skill will realize, the actual minimum desired power flow may vary greatly depending on the system employed.

For example, in one construction, the power output set point is set at 100 kW and the minimum desired power flow is set at 0.5 kW. If the local load 85 is 100 kW, the microturbine engine 10 will supply all of the power to the local load 85 and no power will flow through the tie line 90. The control system 25 will detect that the flow through the tie line 90 is below the minimum desired power flow 120 and will act to either increase or decrease the power output set point. If the power output set point is reduced (to say 99 kW), power will begin flowing (1 kW) into the local load bus 70 from the utility grid 95. If on the other hand, the power output set point is increased (to say 101 kW), the microturbine engine output will increase, with the excess power (1 kW) flowing to the utility grid 95. Under either scenario, the absolute value of the measured power flow through the tie line 90 will eventually exceed the minimum desired power flow 120.

The present system reduces the likelihood of undetected islanding conditions when the engine 10 is driving the generator 20 and producing usable electric power. The generator sensor 80 monitors the current flow from the generator 20 and provides feed back to the control system 25. The control system 25 adjusts the engine 10 to match the output power level to the power output set point. The tie line sensor 105 monitors the current flow through the tie line 90 and provides an additional feed back loop for the control system 25. The measured power flow at the tie line 90 is compared to the minimum desired power flow 120 and the power output set point is reset if the measured power flow falls below the minimum desired power flow 120. The power output set point can be increased or decreased as desired to assure that the measured power flow is above the minimum desired power flow 120. It should be noted that the minimum desired power flow 120 can be input by the engine user or can be preprogrammed into the control system 25. The actual value used is a function of many variables (e.g., engine size, instrument sensitivity, instrument accuracy, system load variations, and the like). As such, the values used herein are exemplary and should not be read as limiting in any way.

The foregoing describes a microturbine engine 10 that drives a synchronous generator 20. As one of ordinary skill will realize, other types of generators (e.g., high-speed alternators, asynchronous generators and the like) could be used with the present invention. Furthermore, the system has been described as including a single master control system 25. As one of ordinary skill will realize, the various control functions could be divided among multiple controllers or multiple control systems as desired. There is no requirement that a single control system perform all of the control functions described herein.

Although the invention has been described in detail with reference to certain preferred embodiments, variations and modifications exist within the scope and spirit of the invention as described and defined in the following claims.

What is claimed is:

1. An engine control system for avoiding an islanding condition, the engine control system configured to control an engine that generates power and is electrically connected to an electrical grid and a local load that consumes power, the engine control system comprising:
   a sensor configured to transmit a signal indicative of the difference between the power generated by the engine and the power consumed by the load; and
   a master control system configured to receive the signal and vary the power generated by the engine to maintain a difference between the power generated by the engine and the power consumed by the load.

2. The engine control system of claim 1, wherein the absolute value of the difference between the power generated by the engine and the power consumed by the local load is greater than a predetermined value.

3. The engine control system of claim 2, wherein the predetermined value is stored in the master control system by a user.

* * * * *